Figure 1:
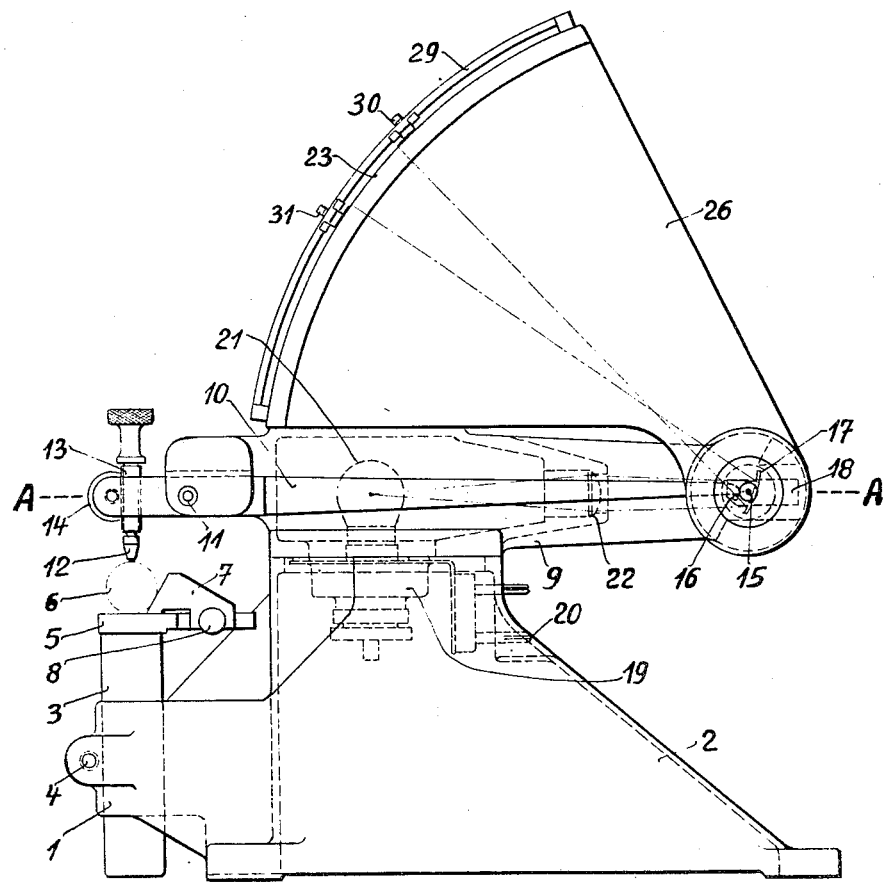

Nov. 29, 1932.   F. WENDE   1,889,719
MEASURING APPARATUS
Filed Dec. 30, 1930   2 Sheets-Sheet 1

INVENTOR:
FRANZ WENDE
BY
ATTORNEY

INVENTOR:
FRANZ WENDE
BY ATTORNEY

Patented Nov. 29, 1932

1,889,719

UNITED STATES PATENT OFFICE

FRANZ WENDE, OF BERLIN, GERMANY, ASSIGNOR TO FRITZ WERNER AKTIENGESELL-SCHAFT, OF BERLIN-MARIENFELDE, GERMANY

MEASURING APPARATUS

Application filed December 30, 1930, Serial No. 505,643, and in Germany February 7, 1929.

My invention relates to a measuring apparatus of the comparator type, and more particularly to an apparatus of such type wherein indication of the dimension measured is given by optical means including a mirror or other suitable reflector.

The primary object of my invention is to provide a measuring device which permits the operator to quickly and accurately inspect and check work pieces or other parts having but a comparatively small allowance of departure from a nominal dimension, such as .0004 to .00004 inch. Another object is to provide means to give a visible indication of such departure on a greatly magnified scale. Further objects are to provide an apparatus of rugged and compact structure Which will stand careless handling by unskilled labor without affecting its accuracy;

Which may easily be operated independent of the skill of the operator;

The operation of which eliminates a human element being independent on the sense of feeling etc;

Which is independent of the light conditions prevailing in the room or hall where the inspection is carried out;

Which is inexpensive regarding the initial cost and the cost of manufacture.

The production of interchangeable parts of machines or all sorts of devices on a large scale calls for reliable means permitting unskilled labor to check and inspect the parts in the course of the manufacturing process in a minimum of time. The measuring and checking process, therefore, must be so simple that it does not take more than a few seconds to check the part in order to obtain increased accuracy.

All of these objects have been attained by my novel device which substantially comprises a lever adapted to be set by the gauging feeler to a certain inclination and extending away from said feeler to a rotatable reflector which, in its turn, is set by the lever in dependence on the dimension checked and casts a beam from a suitable source of light in forward direction on a screen arranged in close proximity, either adjacent to or above the gauging feeler. Particular advantages flow from this arrangement of the screen as it facilitates rapid and accurate inspection. The use of the light beam and reflector permits the obtaining of twice the magnification that could be secured by means of a mechanical pointer and with greatly increased accuracy. Moreover, the projection of the beam on a screen which is preferably transparent can easily be perceived by the operator, especially in poorly lighted work shops. It will be appreciated that a rugged structure of comparatively small dimensions flows from the arrangement of the screen adjacent to the gauge feeler and of the reflector located at a distance therefrom at the rear.

A preferred embodiment of my invention is illustrated in the accompanying drawings and will be described hereinafter.

Figure 2:
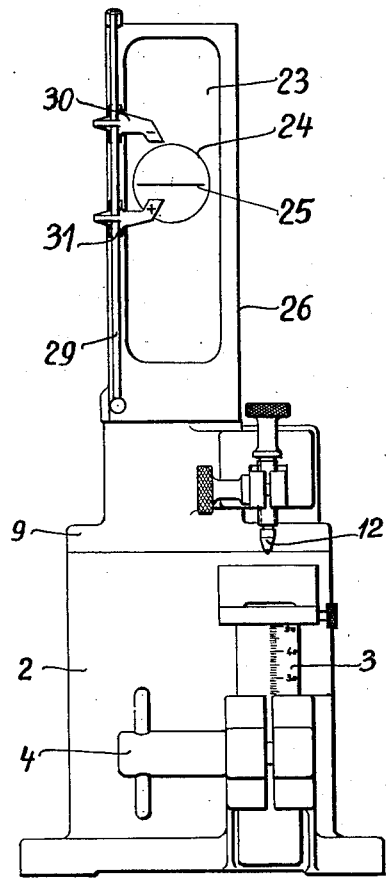
Figure 3:
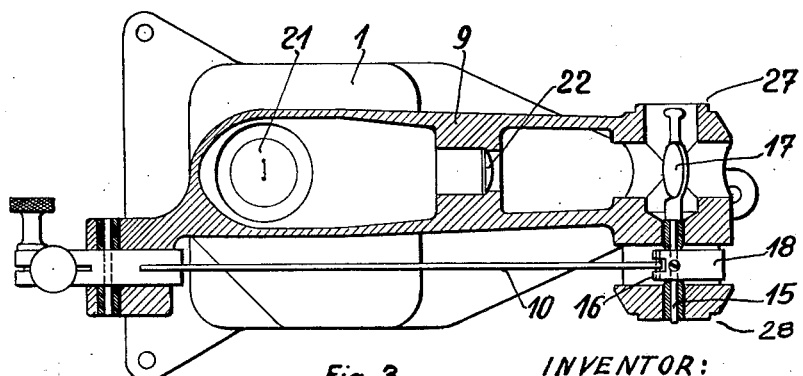

Fig. 1 is an elevation of my novel apparatus,

Fig. 2 a front view from the left of Fig. 1,

Fig. 3 a section on line A—A of Fig. 1,

Fig. 4 a top view.

Figure 4:
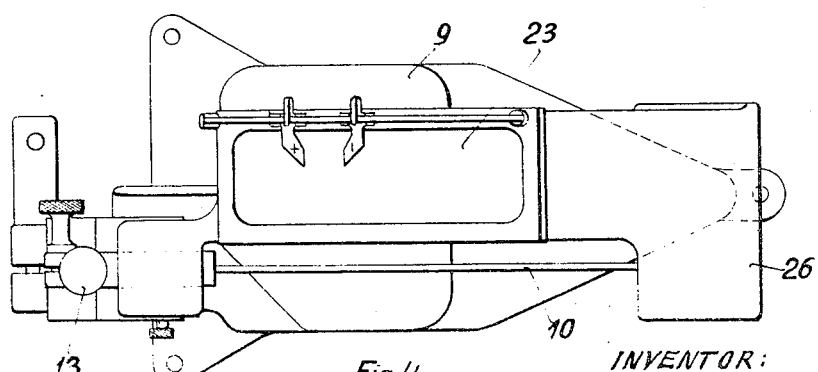

The hollow frame 2 of the machine is formed with a slotted guiding sleeve 1 accommodating a vertically movable post 3 adapted to be clamped in position in the sleeve by means of a screw 4 and carrying a support plate 5 for the piece 6 to be measured. The frame may be a one part structure or it may be a composite structure. A prism-shaped member 7 horizontally guided on plate 5 and adapted to be fixed in a suitable position by a screw 8 permits the operator to positively position the piece 6 on the support relative to the gauge feeler 12. The post 3 may be provided with a suitable scale as indicated in Fig. 2. The frame consists of the above-mentioned lower part 2 and an upper hollow part 9 formed with a fork-shaped projection (shown in section on the left side of Fig. 3) wherein a horizontal axle 11 is mounted. This axle carries a normally horizontal double-armed lever 10 having a short arm extending above the support plate 5 and having a comparatively long arm projecting toward the right with reference to Figs. 1, 3 and 4. The shorter arm is preferably provided with some sort of gauging feeler which may really be considered part of the lever and may be made integral therewith. Preferably, however, the feeler is formed by a vertical bolt 12 screwed in a suitable threaded hole of the arm to be capable of vertical adjustment thereto. The end of the arm of lever 10 may be made slotted and provided with a clamping screw 14 permitting to fix the feeling bolt 13 in its adjusted position.

Part 9 of the frame extends to the right with reference to Fig. 1 and its end is formed with a fork-shaped portion similar to that which carries lever 10 and likewise serving as a bearing for a rotatable axle 15 which is parallel to the axle 11 and disposed at substantially the same level. A lever is rigidly attached to this shaft having a fork-shaped arm 16 and a weighted arm 18. A pin extends between the tines of the fork 16 and is kept in permanent contact with the lower face of the end of lever 10 by action of the weight 18. The one end of axle 15 carries a mirror 17 inside of the part 9. This mirror, the axle 15 and the lever 16, 18 which may be made integral, if desired, will be referred to hereinafter as the reflector.

From the foregoing it will be apparent that the angular disposition of the reflector will be determined by the inclination of the lever 10 which, in its turn, depends on the dimensions of the piece 6. In order to reduce relative friction between the lever 10 and the reflector, I prefer to arrange the point of contact of the lever 10 with the pin of fork 16 substantially in the same level with the axles 11 and 15.

The upper part 9 of the frame includes a socket 19 for an electric bulb 21 and a lens 22 positioned about midway between the bulb and the mirror 17. The bulb may be connected by the customary plug connection to the electric light system and, for this reason, electric contact pins 20 are provided. The lens serves to confine a light beam and to cast the same on the mirror 17 by which it will be reflected and projected on an arc-shaped screen 23. The mirror is preferably made hollow and marked with a thin horizontal line so that it will reflect on the screen a circular brightly illuminated light spot indicated at 24 formed with a dark horizontal line 25.

The screen 23 preferably made of a suitable translucent material is arranged with the center of its arc coinciding with the axle 15 of the reflector in order to obtain a sharp and distinct boundary line of the light spot on the screen regardless of its position thereon.

The screen 23 forms the front of a thin-walled casing 26 which is rotatably supported on pivot-like projections 27, 28 of the frame 9. The casing serves to preserve the interior of the apparatus to which access may be had by swinging the casing in clockwise direction with reference to Fig. 1.

A guiding rail 29 provided at the one side of the screen co-extensive therewith and serving as a support for two pointers 30 and 31 facilitates the comparison of successive work pieces. The pointers 30 and 31 may be shifted to a desired position to permit of comparing the indication with the desired amount. It will be understood that the limits of the allowance in case of mass production of work pieces may be indicated by a suitable setting of the pointers and that the pieces measured may thus be checked in this regard. All the operator has to do is to watch whether or not the black line will be situated within the zone limited by the pointers. If this should not be the case, the work piece measured is not satisfactory.

It will be easily understood that, if the ratio of the arms of lever 10 amounts to 1:10 and the ratio of arm 16 to the long arm of lever 10 to 1:50, a displacement of the gauge feeler 12 will result in a displacement of the light spot which is 1000 times greater, that is to say, a difference of .0004 inch in diameter of the piece 6 will result in a displacement of the light spot on the screen by .4 inch, as the reflector will duplicate the ratio of magnification.

From the foregoing description it will be apparent that my novel comparator is independent of the operator's sense of feeling and skill and permits the rapid and accurate checking of pieces by comparison with a master piece. Moreover, my apparatus may be employed at poorly lighted places of the factory and may thus be used at practically any place, for instance in the path of the work pieces wandering from one machine to another. The operation is simple and will not tire the operator as is the case in similar apparatus where the operator has to look through a magnifying glass.

I wish it to be understood that my invention is in no way limited to the particular embodiment shown, but is capable of a great number of variations without departing from the spirit of my invention. Thus, the apparatus may be adapted by simple changes to measure the distance between internal faces, as is common in the art.

What I claim is:—

1. An apparatus for measuring a dimension of a work piece comprising a frame, a work support thereon, a double-armed lever and a reflector, both swingably mounted on said frame about horizontal axes disposed in substantially the same plane, said lever having an arm extending above said support and adapted to be set by a work piece positioned thereon and having its other arm projecting toward said reflector, the latter being provided with a projection arranged in direct contact with the end of said arm at a point normally situated substantially in said plane whereby said reflector will be angularly set in dependance on the dimension of the work piece, a projector mounted on said frame to cast a light beam on said reflector and an arc-shaped screen mounted on said frame at the front of the apparatus and in the neighborhood of said first-mentioned arm with said reflector at its center to receive from the latter the reflection of the beam at a point depending on the setting of said reflector and, therefore, giving visible indication of the dimension of the work piece.

2. An apparatus for measuring a dimension of a work piece comprising, a frame provided with means on the front lower portion thereof for supporting the work piece, a double armed lever and a reflector, both swingably mounted on said frame about horizontal axes disposed in substantially the same plane, said lever having one arm extending above said work supporting means adapted to be adjusted by a work piece positioned thereon and having its other arm projecting toward said reflector, said reflector having a projection thereon arranged in direct contact with the end of said arm at a point normally situated substantially in the said plane whereby said reflector will be angularly set in dependence on the dimension of the work piece, a projector mounted on said frame to cast a light beam on said reflector, and an arc-shaped translucent screen at the front of the apparatus above the plane of said work support and in close proximity to said first-mentioned arm, said arc-shaped screen being mounted on said frame with said reflector at its center to receive from the latter the reflection of the beam at a point depending on the setting of said reflector, and, therefore, giving visible indication on the outside of said screen of the dimension of the work piece.

3. An apparatus for measuring a dimension of a work piece comprising, a frame provided with means on the front lower portion thereof for supporting the work piece, a double armed lever and a reflector, both swingably mounted on said frame about horizontal axes disposed in substantially the same plane, said lever having one arm extending above said work supporting means adapted to be adjusted by a work piece positioned thereon and having its other arm projecting toward said reflector, said reflector having a projection thereon arranged in direct contact with the end of said arm at a point normally situated substantially in the said plane whereby said reflector will be angularly set in dependence on the dimension of the work piece, a projector mounted on said frame to cast a light beam on said reflector, an arc-shaped translucent screen at the front of the apparatus above the plane of said work support and in close proximity to said first-mentioned arm, said arc-shaped screen being mounted on said frame with said reflector at its center to receive from the latter the reflection of the beam at a point depending on the setting of said reflector, and, therefore, giving visible indication on the outside of said screen of the dimension of the work piece, and settable pointers mounted adjacent said screen.

4. An apparatus for measuring a dimension of a work piece comprising, a frame provided with means on the front lower portion thereof for supporting the work piece, a double armed lever and a reflector, both swingably mounted on said frame about horizontal axes disposed in substantially the same plane, said lever having one arm extending above said work supporting means adapted to be adjusted by a work piece positioned thereon and having its other arm projecting toward said reflector, said reflector having a projection thereon arranged in direct contact with the end of said arm at a point normally situated substantially in the said plane whereby said reflector will be angularly set in dependence on the dimension of the work piece, a projector mounted on said frame to cast a light beam on said reflector, an arc-shaped translucent screen at the front of the apparatus above the plane of said work support and in close proximity to said first-mentioned arm, said arc-shaped screen being mounted on said frame with said reflector at its center to receive from the latter the reflection of the beam at a point depending on the setting of said reflector, and, therefore, giving visible indication on the outside of said screen of the dimension of the work piece, said reflector being positioned to reflect said beam in an inclined upward direction, said screen having its lower end near said plane and extending therefrom.

5. An apparatus for measuring a dimension of a work piece comprising, a frame provided with means on the front lower portion thereof for supporting the work piece, a double armed lever and a reflector, both swingably mounted on said frame about horizontal axes disposed in substantially the same plane, said lever having one arm extending above said work supporting means adapted to be adjusted by a work piece positioned thereon and having its other arm projecting toward said reflector, said reflector having a projection thereon arranged in direct contact with the end of said arm at a point normally situated substantially in the same plane whereby said reflector will be angularly set in dependence on the dimension of the work piece, a projector mounted on said frame to cast a light beam on said reflector, an arc-shaped translucent screen at the front of the apparatus above the plane of said work support and in close proximity to said first-mentioned arm, said arc-shaped screen being mounted on said frame with said reflector at its center to receive from the latter the reflection of the beam at a point depending on the setting of said reflector, and, therefore, giving visible indication on the outside of said screen of the dimension of the work piece, one of the elements positioned in the path of the light beam being provided with a thin dark horizontal line, whereby the reflector is adapted to reflect on the screen a light spot having a dark horizontal line thereon.

6. An apparatus for measuring a dimension of a work piece comprising, a frame provided with means on the front lower portion thereof for supporting the work piece, a double armed lever and a reflector, both swingably mounted on said frame about horizontal axes disposed in substantially the same plane, said lever having one arm extending above said work supporting means and adapted to be adjusted by a work piece positioned thereon and having its other arm projecting toward said reflector, said reflector being provided with a projection arranged in direct contact with the end of said arm at a point situated substantially in the said plane whereby said reflector will be angularly set in dependence on the dimension of the work piece, a projector mounted centrally on said frame to cast a light beam on said reflector, and an arc-shaped translucent screen at the front of the apparatus above the plane of said work support and in close proximity thereto, said screen being mounted on said frame with said reflector at its center to receive from the latter the reflection of the beam at a point depending on the setting of said reflector, and, therefore, giving visible indication on the outside of said screen of the dimension of the work piece, the upper portion of said frame forming a sector shaped casing pivotally mounted on the frame proper, whereby convenient access is provided to said double armed lever, reflector, and said projector, said arc-shaped translucent screen constituting the peripheral front wall of the sector shaped portion of said frame.

7. An apparatus for measuring a dimension of a work piece comprising, a body portion, a double armed lever and a reflector, both swingably mounted on said body portion about parallel axes, said lever having one arm adapted for adjustment by the work piece and having its other arm projecting towards said reflector, said reflector being cooperatively associated with the end of said arm, whereby said reflector will be angularly set in dependence on the dimension of the work piece, a projector mounted on said body portion to cast a light beam on said reflector, an arc-shaped translucent screen mounted on said frame in front of the apparatus in close proximity to said first-mentioned arm and with said reflector at its center to receive from the latter the reflection of the beam at a point depending on the setting of said reflector and, therefore, giving visible indication on the outside of said screen of the dimension of the work piece.

8. An apparatus for measuring a dimension of a work piece having a frame provided with means on its front portion for supporting the work piece, a double-armed lever and a reflector, both swingably mounted on said frame about parallel horizontal axes, said lever having one arm extending above said work supporting means for contact with a work piece positioned thereon and having its other arm projecting towards said reflector, said reflector having a projection arranged in direct contact with the end of said arm, whereby said reflector will be angularly set in dependence on the dimension of the work piece, a projector mounted on said frame to cast a light beam on said reflector within a plane perpendicular to said axes, the upper portion of said frame forming a sector-shaped casing, and an arc-shaped translucent screen constituting the peripheral front wall of said casing and positioned above said work supporting means and in close proximity to said first-mentioned arm, said arc-shaped screen being curved about the pivotal axis of said reflector to receive from the latter the reflection of the beam at a point depending on the setting of said reflector, and, therefore, giving visible indication on the outside of said screen of the dimension of the work piece.

In testimony whereof I affixed my signature.

FRANZ WENDE.